United States Patent [19]

Cain et al.

[11] Patent Number: 4,600,997

[45] Date of Patent: Jul. 15, 1986

[54] SURVEYING SYSTEM

[75] Inventors: Gary L. Cain; Elvin K. Honey, both of Springfield; Sidney B. Goren, Troy, all of Ohio

[73] Assignee: Spectra-Physics, Inc., San Jose, Calif.

[21] Appl. No.: 492,554

[22] Filed: May 9, 1983

[51] Int. Cl.$^4$ .................. G01C 11/12; G06F 15/20
[52] U.S. Cl. ........................ 364/505; 356/2; 356/4; 364/550; 364/562
[58] Field of Search ............... 364/140, 142, 505, 506, 364/525, 556, 550, 562; 356/2, 4; 340/600, 601; 33/174 P, DIG. 21; 73/432 L; 172/4.5

[56] References Cited

U.S. PATENT DOCUMENTS

| | | | |
|---|---|---|---|
| 3,588,249 | 6/1971 | Studebaker | 33/DIG. 21 |
| 3,680,958 | 8/1972 | Von Bose | 356/2 X |
| 3,976,975 | 8/1976 | Cochran | 364/709 X |
| 4,060,718 | 11/1977 | Huddle | 324/323 X |
| 4,090,247 | 5/1978 | Martin | 364/900 |
| 4,113,381 | 9/1978 | Epstein | 356/4 X |
| 4,205,385 | 5/1980 | Erickson et al. | 364/560 |
| 4,380,054 | 4/1983 | Carruth, Jr. | 364/421 X |
| 4,400,783 | 8/1983 | Locke, Jr. et al. | 364/550 X |
| 4,471,530 | 9/1984 | Kirven | 33/174 P X |

FOREIGN PATENT DOCUMENTS 0094610 6/1982 Japan ........................ 356/4

Primary Examiner—Errol A. Krass
Assistant Examiner—Kevin J. Teska
Attorney, Agent, or Firm—Marshall & Melhorn

[57] ABSTRACT

A system for surveying the contour of land and for automatically determining the most efficient movement of dirt in order to obtain a desired grade utilizes a stationary transmitter which generates a rotating laser beam plane across the field to be surveyed. A receiver and a control circuit are mounted on a vehicle which is adapted to drive across the field. After providing the control circuit with certain initialization data, an operator drives the vehicle over the field in a predetermined manner to enable the control circuit to take elevational readings at selected points. After the survey has been completed, the operator can use the control circuit to display graphical information relating to the surveyed field. The operator can also utilize the control to calculate the amount of dirt which must be moved in order to obtain a desired grade on the field. The initialization and calculation routines are performed by the operator in response to prompting questions and statements displayed by the control circuit. One feature of the control circuit is the interchangeability of language modules which determine the language of the prompts. Another feature of the control circuit is a removable memory unit for the storage of the elevational data which can be connected to a remotely located computer for further processing of the elevational data.

29 Claims, 9 Drawing Figures

SURVEYING SYSTEM

BACKGROUND OF THE INVENTION

The present invention relates generally to a system for surveying land and, in particular, to an apparatus for gathering and displaying information concerning the contour of land.

Agriculture and construction businesses often require the measurement of the contours of land to obtain information for the leveling of ground for fields or construction sites. For example, a farm field must be contoured so as not to retain surface water which will stunt the growth of and/or damage crops. Therefore, the contour of the field must be measured in order to determine whether dirt must be moved and, if it must be moved, how the least amount of dirt can be moved in order to accomplish the desired grading.

One prior art method of contour measurement was to mark the field in a grid system of rows and columns. For example, a white-colored, sand filled bag would be placed at the intersection of rows and columns on the field, typically at intervals of 100 feet. Then surveying instruments would be utilized to determine the elevation of the marked grid points with respect to a reference or entering point in the grid. The use of the well known surveyor's tripod-mounted sight and stick required the effort of two persons and considerable time in moving the stick from grid point to grid point as marked by the bags.

An improvement in this method of contour measurement was achieved through the use of a laser beam transmitter mounted at a reference point and a receiver mounted on a vehicle which could be driven from grid point to grid point. At each grid point the driver of the vehicle would mark down the reading from the receiver such that only one operator was required and the total time for taking the measurements was considerably reduced.

Either of the above-mentioned methods of measuring the contour of the land required considerable calculations to determine the most efficient distribution of dirt and how much dirt actually had to be moved. Once the dirt movement process had begun, there was no way to check the resulting contour without performing a new survey which required additional time and expense.

Among some of the problems associated with the prior art methods are the inaccuracies due to the movement and resetting of the measurement apparatus and the laborious calculations involved in determining the most efficient movement of the dirt. Additionally, since the cost of the operation is usually based on the amount of dirt moved, the land owner is at the mercy of the person making the calculations.

SUMMARY OF THE INVENTION

The present invention concerns a system for surveying land including the measurement of contours and the automatic determination of the most efficient movement of dirt to obtain the desired grade. The system utilizes a stationary laser beam transmitter and a movable receiver and control circuit mounted on a vehicle. The operator of the vehicle initializes the system by setting the grid point spacing, the north side of the field, and the slope and angle of the laser beam with respect to horizontal into the control circuit. The operator then drives the vehicle over the field in a predetermined manner to enable the control circuit to take elevational readings at each grid point.

The control circuit stores the elevation data until the operator indicates that another survey is to be done or main power is removed. The operator can utilize the control to display each grid square which differs from a reference elevation by more than a predetermined amount, and to display profiles of selected rows or columns of the grid. The operator can also utilize the control to calculate the least amount of dirt which must be moved in order to obtain a graded field. If the slope of this graded field is not satisfactory, the control circuit can recalculate the amount of dirt which must be moved to obtain an operator-selected grade.

The initialization and calculation routines are performed by the operator in response to prompting questions and statements displayed by the control circuit. A feature of the control circuit is the interchangeability of language modules which determine the language of the prompts. Another feature of the control circuit is a removable memory for the storage of the elevation data with a battery power source for preserving the data until it can be read into a remotely located computer for further processing. The removable storage module is interchangeable with a communication module which permits the control circuit to interface with a second control circuit, a printer, or the like.

Additional features of the invention will be apparent from the appended specification and drawings which disclose the invention in its preferred embodiment.

DESCRIPTION OF THE PREFERRED EMBODIMENT

Figure 1:
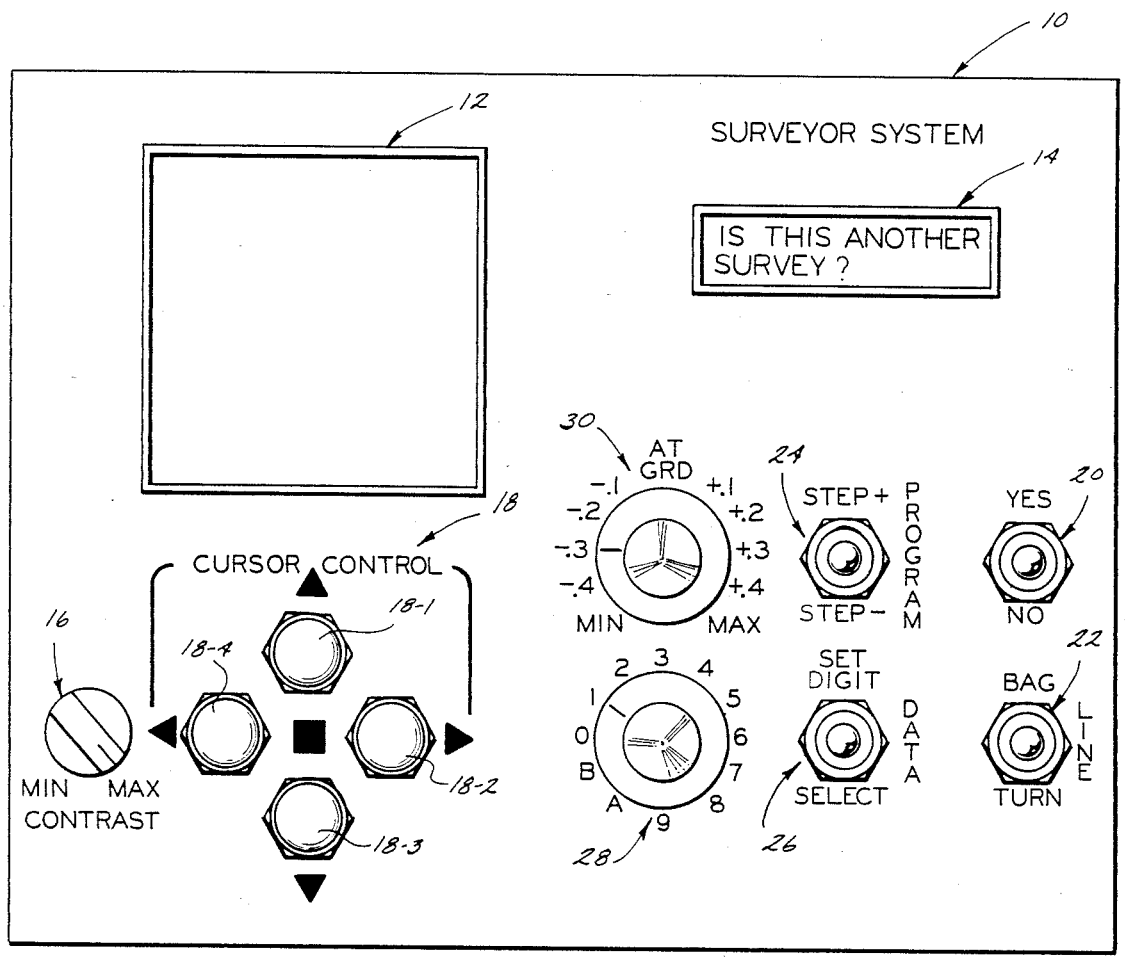
FIG. 1 is a front elevational view of a control panel for the control circuit of the surveyor system of the present invention.

Referring to FIG. 1, there is shown a front elevational view of a control panel 10 which is utilized by an operator to provide data to the survey system and also to display calculated information to the operator. The control panel 10 includes a graphic display 12 which is utilized to display a grid map representing the particular plot of land as the plot is being surveyed. After the plot of land has been surveyed, the display 12 is utilized to display graphical data relating to the elevational data obtained during the survey. In addition to the graphic display 12, the control panel 10 also includes an alphanumeric display 14 for providing messages and calculated data to an operator.

The control panel 10 has a contrast control 16 which is utilized to control the contrast between the background and the displayed information on the graphic display 12. The panel 10 is provided with a cursor control 18 which includes individual pushbutton switches 18-1 through 18-4 for controlling the location of a cursor on the graphic display 12. As will be discussed, the cursor control 18 is utilized by the operator to provide the survey system with certain initialization data.

The control panel 10 also includes a plurality of control switches which are utilized by the operator to respond to inquiries generated by the control system as displayed on the display 14 and are also used to provide data to the control system. Such control switches include a yes/no switch 20 which is utilized by the operator to respond to questions by the control program. A bag/turn switch 22 is utilized by the operator to signal the central control unit when the vehicle has turned and also when the vehicle has reached a location at which it is desired to take an elevational measurement. A program step+/step− switch 24 is utilized by the operator to index through the program steps by moving the switch 24 to the "STEP+" position, or to return to the previous program step by moving the program switch to the "STEP−" position.

A data switch 26 is utilized by the operator in conjunction with a rotary switch 28 to provide the system with data utilized to perform the survey. For example, when the program requests digital data from the operator, a flashing digit will appear on the display 14. In order to provide the program with the data, the operator positions the switch 26 in the "SELECT" setting and then uses the rotary switch 28 to select the desired digit. Once the digit has been selected, the switch 26 is moved to the "SET DIGIT" position and the selected digit is read by a microcomputer. After the digit has been read, the switch 26 is moved to the "SELECT" setting and the operator can then select the next digit.

A grid control switch 30 is utilized at a predetermined point in the surveying program wherein the display 12 can be used to display those grid square locations which are a predetermined amount above or below a predetermined grade. For example, by positioning the grid control 30 at the "AT GRD" setting, the display 12 will indicate which grid square locations are at the desired grade. When the control 30 is positioned at either the "+0.2" or "−0.2" settings, the display 12 will indicate which grid squares are two tenths meters above and below grade respectively with respect to the desired grade. The "MAX" and "MIN" settings display all grid locations which are above and below grade respectively.

Figure 2:
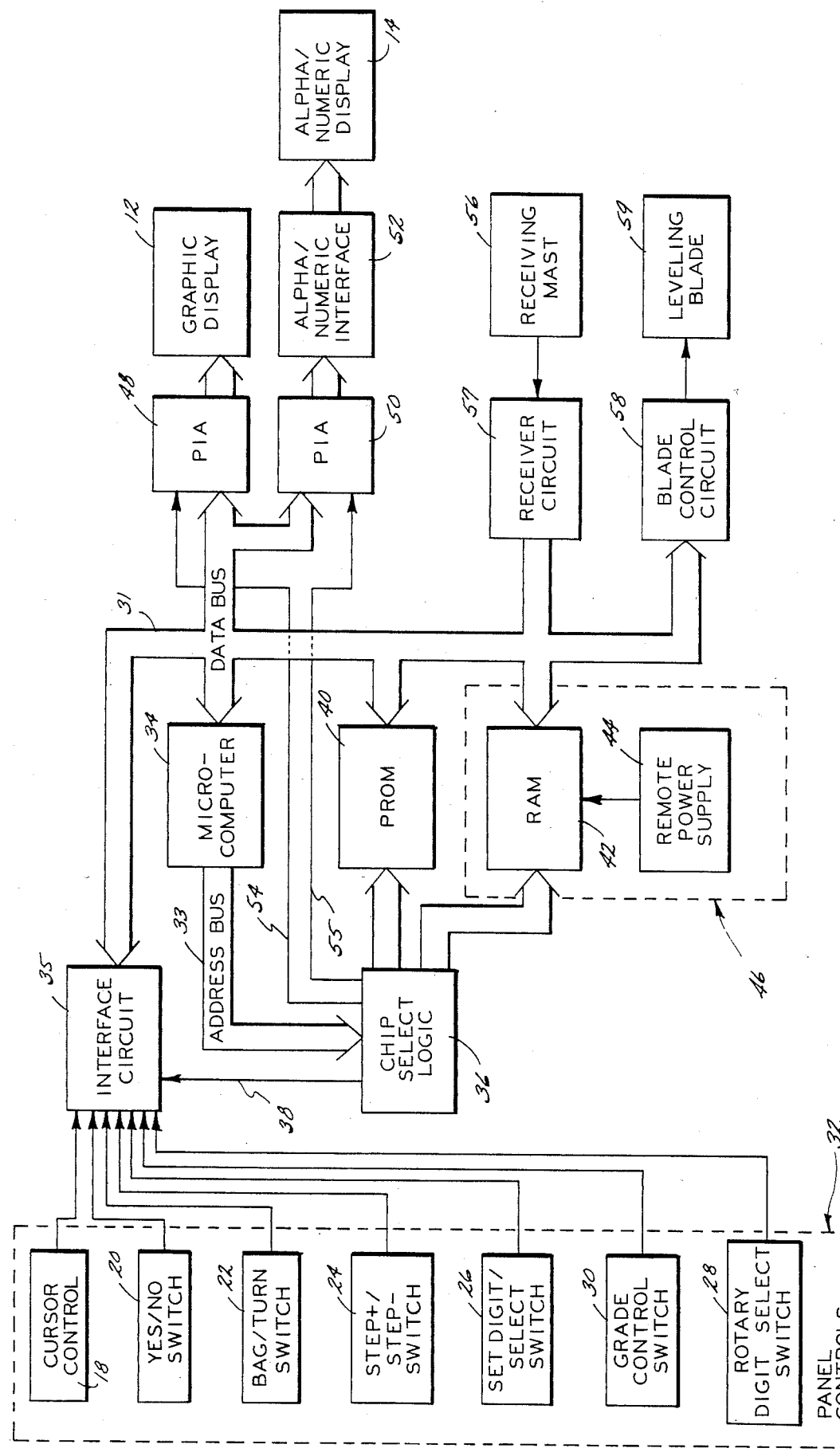
FIG. 2 is a block diagram of the surveyor system of the present invention.

Referring to FIG. 2, there is shown in block diagram form the control system of the present invention. The operating controls previously discussed with reference to FIG. 1 are shown along the left hand portion of FIG. 2 and are enclosed within a phantom box 32. The operating controls generate output signals which are supplied to a data bus 31 of a microcomputer 34 through an interface circuit 35. The microcomputer 34 can be an MC6802 manufactured by Motorola. The microcomputer 34 has an address bus 33 connected to a chip select logic circuit 36 which in turn generates a select signal on a line 38 to the interface circuit 35 when the microcomputer 34 is programmed to read one of the panel control switches.

The data bus of the microcomputer 34 is also connected to receive program instructions from a PROM 40. The PROM 40 is connected to receive address signals from the microcomputer 34 through the chip select logic circuit 36. As will be discussed, the program instructions in the PROM 40 provide messages in a selected language to the operator. The PROM 40 is interchangeable with other PROMs to permit the messages to be displayed to the operator in different languages.

The data bus 31 of the microcomputer 34 is also connected to a RAM memory unit 42. The RAM is connected to receive address signals from the microcomputer 34 through the chip select logic circuit 36. In accordance with the present invention, the RAM unit 42 is connected to a remote power supply 44 such that the RAM 42 and the power supply 44 comprise a separate storage module 46 which can be disconnected from the control system and be transported to a remote location. This enables the data collected by the control system to be transferred to a separate operating system which can provide the operator with printed data.

The microcomputer 34 is connected to supply data as grid signals to the graphic display 12 through a priority interface adaptor (PIA) 48. The microcomputer 34 is also connected to supply data to the alphanumeric display 14 through a PIA 50 and an alphanumeric interface 52. The PIAs 48 and 50 can be MC68201 PIAs manufactured by Motorola and are connected to the data bus 31. The PIAs 48 and 50 are connected to receive chip select signals from the chip select logic circuit 36 on lines 54 and 55, respectively.

A receiving mast 56 is connected to a receiver circuit 57 which is connected to the data bus 31 to supply elevational data as elevation signals to the microcomputer 34. The receiver circuit 57 and the mast 56 can be a model 430000 available from Laserplane Corporation, Dayton, Ohio.

The microcomputer 34 is connected to generate blade height control signals to a blade control circuit 58 over the data bus 31. The circuit 58 is responsive to the blade control signals for positioning a leveling blade 59 mounted on the vehicle at a selected height. As will be discussed, once the desired grade for the field has been selected, the vehicle is driven across the field while the microcomputer automatically controls the blade height in order to move dirt to obtain the desired grade.

The overall operation of the surveying system will now be discussed with reference to the diagrammatic views of FIGS. 3a and 3b along with the flow diagram illustrated in FIGS. 4a through 4e. Initially, a transmitter T which includes a rotating laser beam generator 60 is positioned along one side of a field F which is to be surveyed. Generally, the transmitter T is positioned at the low end of the field and is aimed in the up slope direction. The transmitter T can be a model 1045DLS transmitter available from Laserplane Corporation, Dayton, Ohio.

Figure 3A:
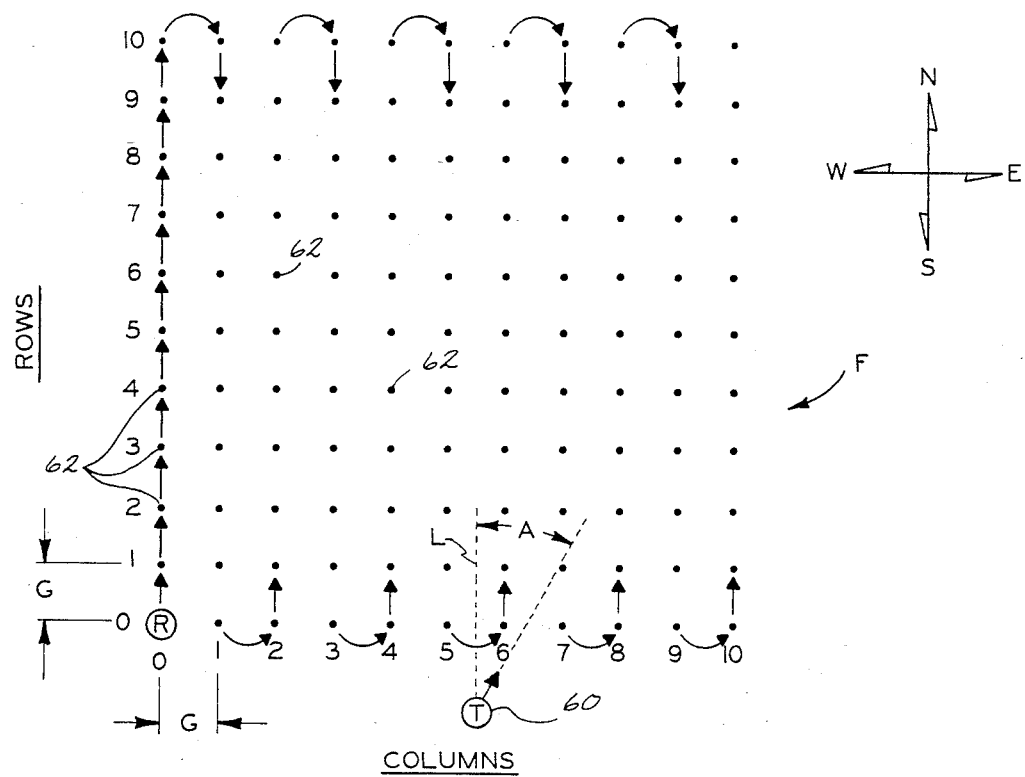
FIGS. 3a and 3b are diagrammatic views illustrating various parameters which must be determined and input to the control circuit of the present invention.
Figure 3B:
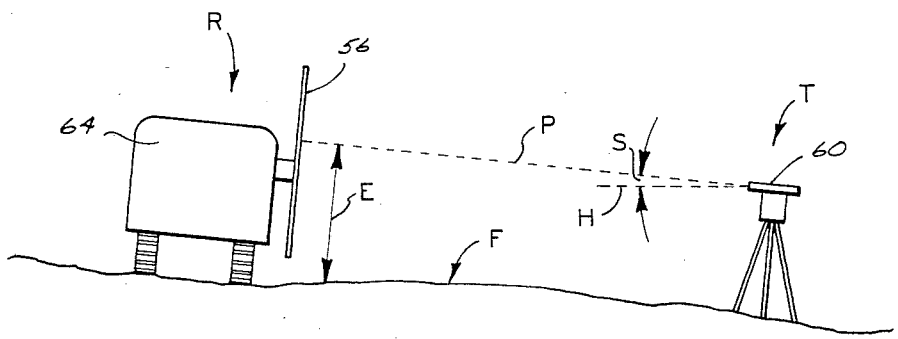

As shown in FIG. 3b, the transmitter T produces a rotating laser beam along-a plane P which is received by a receiver R which has a receiving mast 56 mounted on a vehicle 64. The slope of the rotating laser beam plane is adjusted from the horizontal such that the plane falls within a predetermined receiving range limited by the length of the receiving mast 56 and its height above the ground with respect to the low and high spots on the field. Once the transmitter has been set, the operator is ready to commence the surveying operation.

Figure 4A:
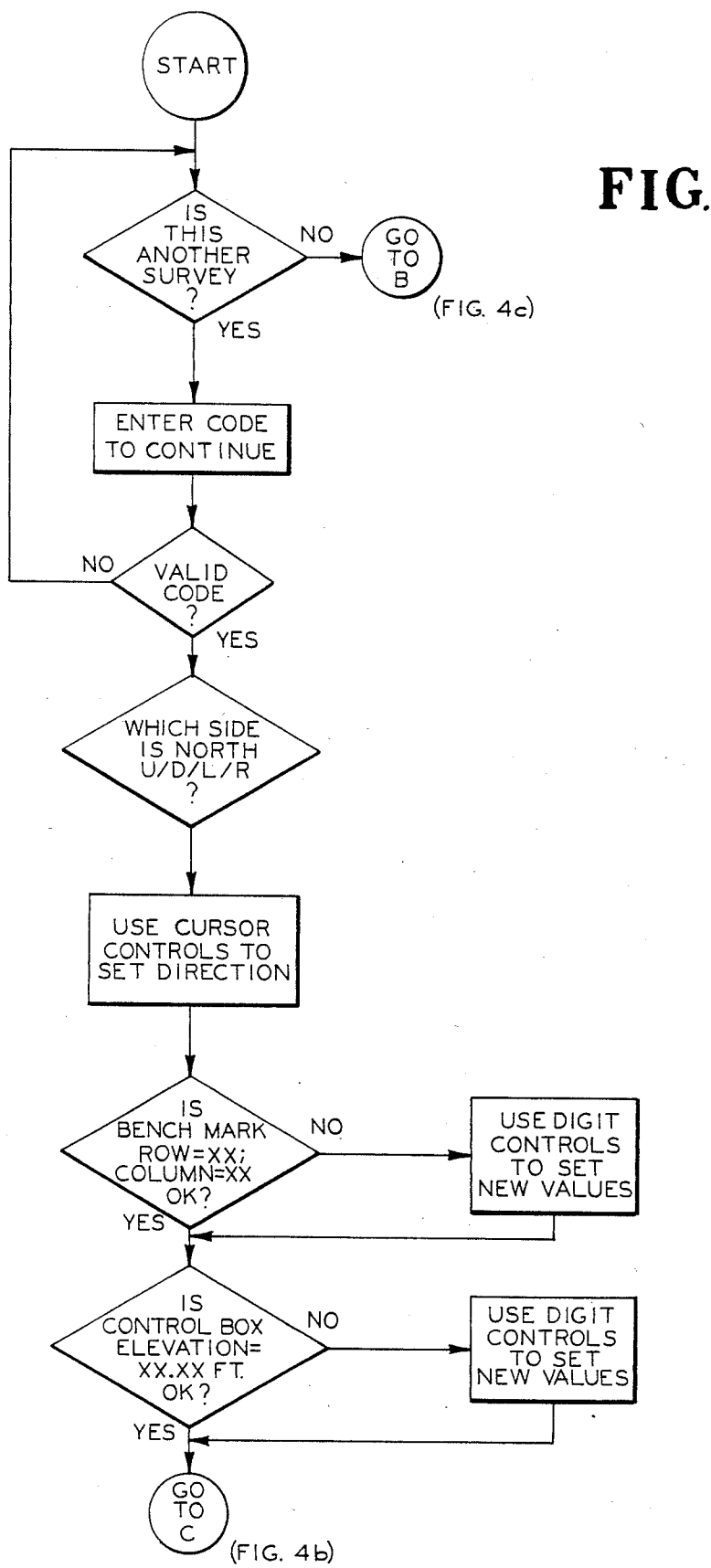
FIGS. 4a through 4e comprise a flow diagram illustrating the operation of the surveying system of the present invention.
Figure 4B:
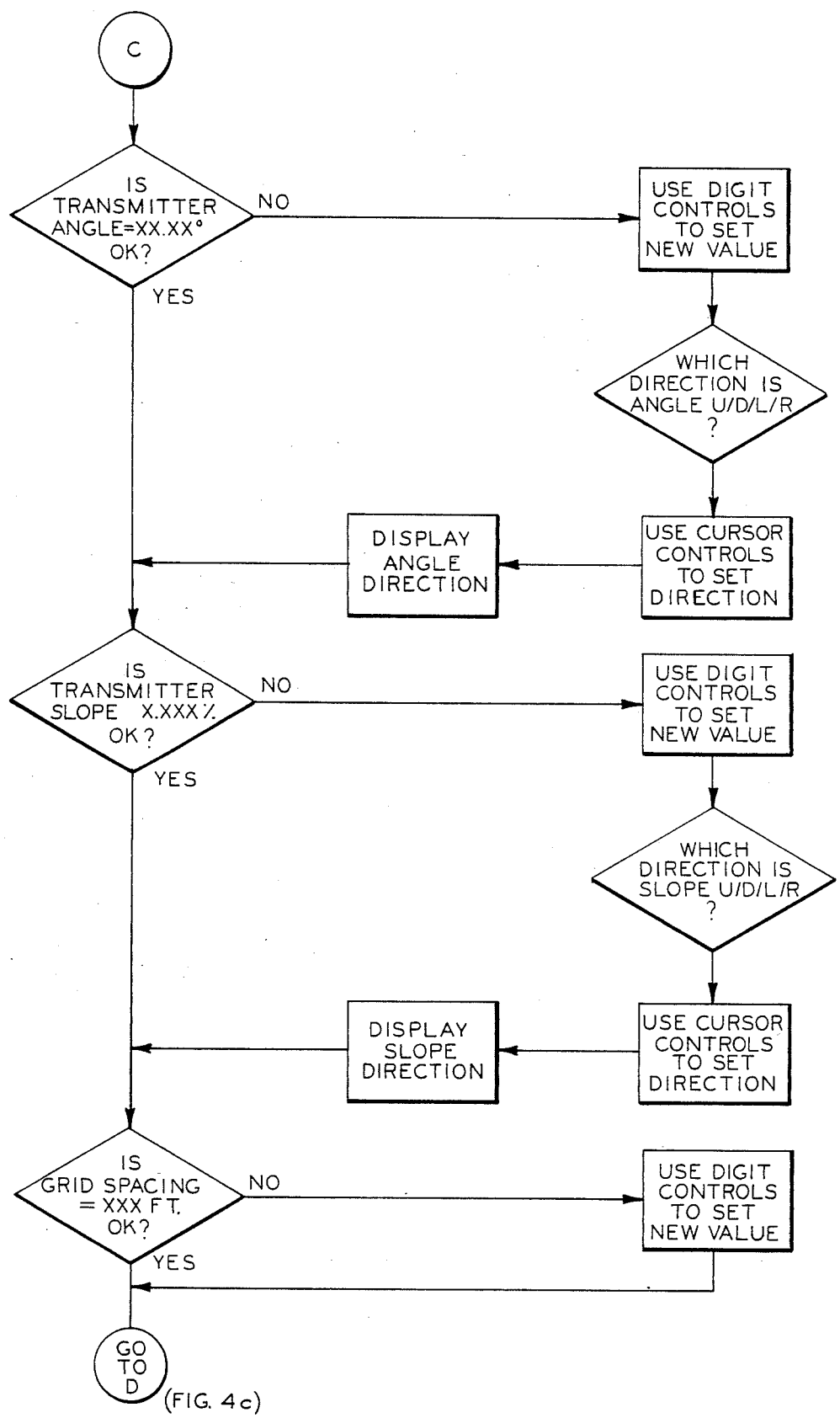

Referring to FIG. 4a, the surveying program stored in the PROM 40 initiates at a circle START when power is turned on and enters a decision point "IS THIS ANOTHER SURVEY?" wherein the control system displays this message on the alphanumeric display 14, as shown in FIG. 1. The operator then responds by utilizing the yes/no switch 20 to answer the question. If the operator responds with a "NO", the program branches to point B of FIG. 4c which, as will be discussed, includes a routine for reviewing the surveyed field. If the operator responds with a "YES", the program branches to a processing function "ENTER CODE TO CONTINUE" wherein this message is displayed to the operator. At this time, the operator must enter a predetermined code using the data switch 26 and the rotary switch 28 in order to conduct a survey. By requiring such a code prior to performing a survey, the system prevents the erasing of previous data which is cleared from storage when a new survey is begun.

If a valid code is not received, the program returns to the start location from the "NO" branch of the decision point "VALID CODE?". If a valid code has been entered, the program branches at "YES" to a decision point and asks the operator "WHICH SIDE IS NORTH U/D/L/R?". The program enters a processing function "USE CURSOR CONTROLS TO SET DIRECTION" and the operator can then actuate the particular one of the cursor controls 18-1 through 18-4 which represents the north side of the field, the side of the field closest to magnetic north. The program then acknowledges the operator's selection by indicating on the graphic display 12 which side of the display represents the north side of the field.

After the operator has set the north direction, the program enters the decision point "IS BENCH MARK ROW=XX; COLUMN=XX OK?". The bench mark represents the particular row and column position where the leveling blade 59 is set at a predetermined height relative to the ground. If the location of the bench mark on the display 12 does not correspond to the actual location, the operator responds with a "NO", and the program then enters a processing function "USE DIGIT CONTROLS TO SET NEW VALUES" at which time the digit select switches 26 and 28 are utilized to set a new bench mark. If the present bench mark location corresponds to the actual bench mark location, the operator responds with a "YES". The program enters the decision point "IS CONTROL BOX ELEVATION=XX.XX FT. OK?" from both the "YES" and "NO" branches of the previous decision point.

The control box elevation, shown in FIG. 3b as height E, represents the vertical distance between a predetermined point on the receiver mast 56 and the ground. If the control box elevation setting does not correspond to the actual setting, the operator responds with a "NO". The program enters a processing function "USE DIGIT CONTROLS TO SET NEW VALUES" and the operator then utilizes the digit select switches 26 and 28 to set a new control box elevation. However, if the present control box elevation setting is correct, the operator responds with a "YES". The program enters a decision point "IS TRANSMITTER ANGLE=XX.XX° OK?" shown in FIG. 4b from both the "YES" and "NO" branches.

The transmitter angle, as shown in FIG. 3a, represents the angle A at which the transmitter T is aimed relative to a selected reference direction line L. If the transmitter angle setting is not correct, the operator responds with a "NO" and utilizes the digit select switches to set a new value at a processing function "USE DIGIT CONTROLS TO SET NEW VALUE". After a new value has been set, the program asks the operator "WHICH DIRECTION IS ANGLE U/D/L/R?" and the operator responds by using the cursor controls 18 to indicate the direction from which the transmitter angle was calculated at a processing function "USE CURSOR CONTROLS TO SET DIRECTION". For example, in FIG. 3a, if the top edge of the display 12 represents the north side of the field, the operator actuates the switch 18-1 to indicate that the transmitter angle A is referenced to the north direction. The new angle direction is displayed by a processing function "DISPLAY ANGLE DIRECTION". If the transmitter angle setting is correct, the operator responds with a "YES". The program enters a decision point "IS TRANSMITTER SLOPE=X.XXX% OK?" from both the "YES" and "NO" branches of the transmitter angle decision point.

The transmitter slope, as shown in FIG. 3b, represents the angle S between the rotating laser beam plane P and the horizontal line H. If the transmitter slope setting is not correct, the operator responds with a "NO" and uses the digit select switches to set a new value at a processing function "USE DIGIT CONTROLS TO SET NEW VALUE". After the new value has been set, the program asks the operator "WHICH DIRECTION IS SLOPE U/D/L/R?" and the operator responds by using the cursor controls 18 to indicate the direction of the slope in a processing function "USE CURSOR CONTROLS TO SET DIRECTION" and a processing function "DISPLAY SLOPE DIRECTION" displays the direction on the display 12. Since typically the transmitter is aimed in the upslope direction, the direction of the slope will usually be the same direction from which the transmitter angle was referenced.

If the transmitter slope setting was correct, the operator responds with a "YES". The program enters a decision point "IS GRID SPACING=XXX FT. OK?" from both the "YES" and "NO" branches. The grid spacing represents that distance, shown in FIG. 3a as distance G, between the individual bags 62. If the present spacing as shown on the display 14 is not correct, the operator responds with a "NO" and utilizes the digit select switches to set a new value for the grid spacing in the processing function "USE DIGIT CONTROLS TO SET NEW VALUE". If the grid spacing as displayed is correct, the operator responds with a "YES". The program branches to point D in FIG. 4c from both the "YES" and "NO" branches.

At point D, the program is ready to receive elevational data and the program enters a processing function "ROW=XX COLUMN=XX ELEVATION=XX.XX" wherein the row and column position of the elevational point which is to be read is displayed. Typically, the control system is programmed to receive the elevational data in a predetermined sequence. For example, FIG. 3a shows one manner in which the system can be programmed to receive elevational data by starting at the row #0, column #0 position while sequentially taking an elevational reading at each row grid point in column #0, and then turning the vehicle to head in the opposite direction down column #1. Thus, when the vehicle reaches the end of a column traveling in one direction, the vehicle moves to the next column and travels in an opposite direction. When the vehicle 64 reaches a grid point at which elevational data is to be read, the operator moves the switch 22 to the "BAG" position and the microcomputer 34 reads the respective elevation height signal from the receiver circuit 57 and displays this information to the operator on the display 14. When the vehicle reaches the end of each column, the operator moves the switch 22 to the "TURN" position to signal the microcomputer that the vehicle is changing direction.

The display 12 can be utilized to assist the operator in supplying elevational data to the system. For example, the display 12 can display a flashing dot on the screen indicating the next grid point which is to be read. As each grid point is read, the flashing dot can be changed to a solid dot such that the display will indicate that portion of the field which has been surveyed.

Once the entire field has been surveyed, the program can be indexed by utilizing the switch 24 to either point B (FIG. 4c) wherein the following portion of the program can be utilized in conjunction with the graphical display 14 to review the contour of the surveyed field or, to point E (FIG. 4d), wherein the following portion of the program can be utilized to make field calculations concerning the surveyed field. These portions of the program will be discussed in more detail hereinafter.

In the event the operator is not able to complete the survey on a particular day, the system can be turned off and then later restarted to complete the survey. For example, if a survey has been started but not completed, the operator would respond to the decision point "IS THIS ANOTHER SURVEY?" of FIG. 4a with a "NO" wherein the program would branch to point B in FIG. 4c. By responding with a "NO" to the next three decision points, which will be discussed in more detail hereinafter, the program will enter a decision point "CONTINUE SURVEY?". The operator then responds with a "YES" and the program enters the processing function following point D which displays the row and column position of the next grid point at which an elevational reading is to be taken. The operator can then complete the survey in a manner as outlined above. When the survey is completed, and no flag has been set, the program branches through a decision point "FLAG SET?" at "NO" to a decision point "CONTINUE SURVEY?".

In some instances, once the survey has been completed, it may be necessary for the operator to check the elevation at a particular grid point or, in the event an obstruction was in the field which prevented a measurement at a particular grid point, change the elevational reading at that grid point to the desired value. In order to effect such a grid point check or change, the operator indexes through the program to the decision point "GRID POINT CHECK OR CHANGE?", which is the third decision point below point B found in FIG. 4c. By responding with a "YES" to this decision point, the program will set a flag at a processing function "SET FLAG" and enter the processing function which displays the elevational data relating to a particular row and column position. The program then enters the decision point "FLAG SET?". If the operator has responded to the decision point "GRID POINT CHECK OR CHANGE?" with a "YES", the flag will have been set and the program enters the processing function "CHANGE DATA USING DIGIT CONTROLS". At this point, the operator can select a particular row and column position at which he wishes to check the elevational data, and then, if desired, can change the elevational reading at this location. The program then enters a processing function "CLEAR FLAG" wherein the flag is cleared, and then enters the decision point "CONTINUE SURVEY?".

Figure 4C:
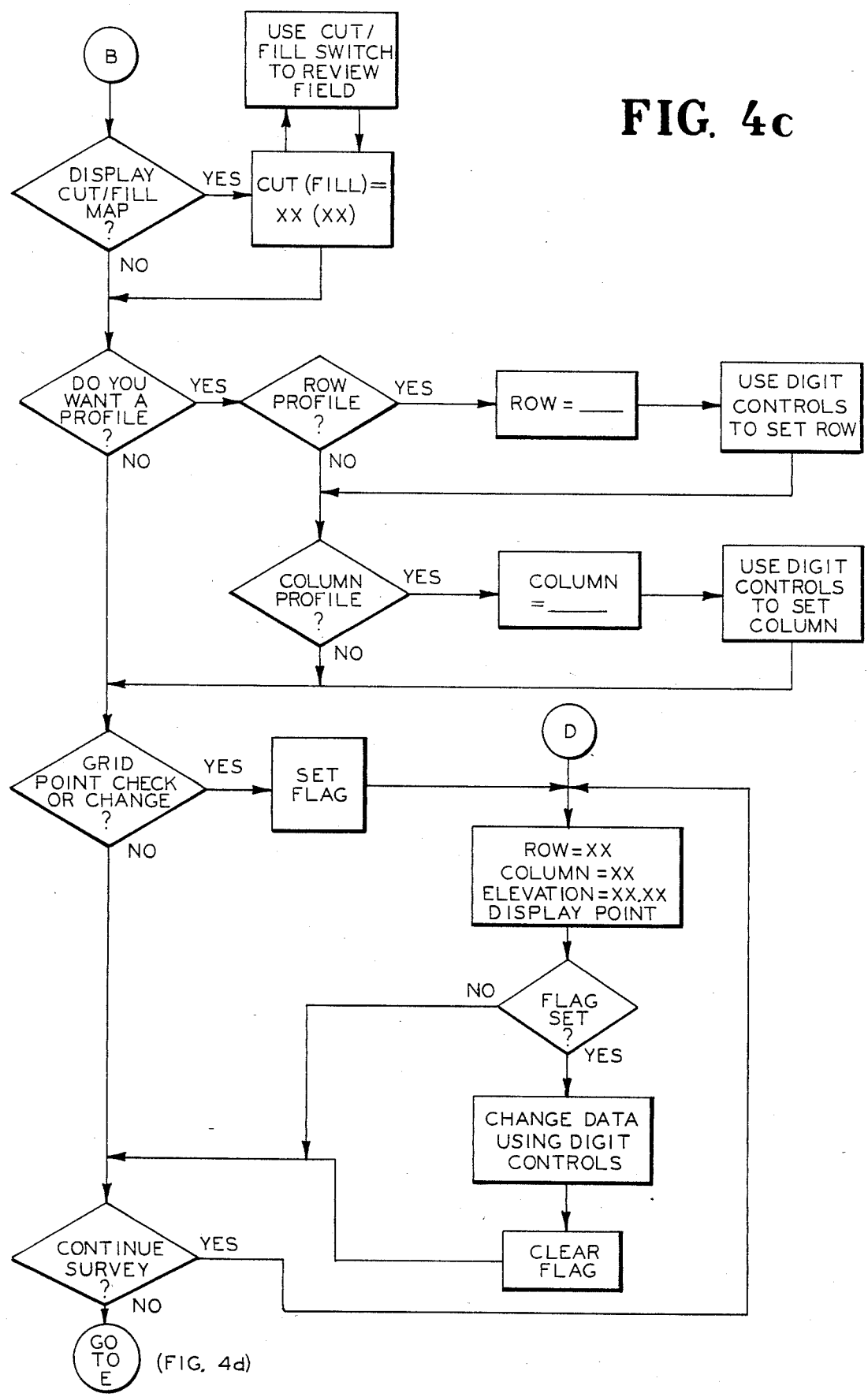

Once the field has been surveyed, the operator can index the program to point B in FIG. 4c and utilize the display 14 to graphically review the field. From point B, the program enters a decision point wherein the message "DISPLAY CUT/FILL MAP?" is displayed for the operator. The cut/fill map provides the operator with information relating to the sections of the field from which dirt must be removed or cut, and those sections to which dirt must be added or filled. If the operator wishes to view the cut/fill map, he responds with a "YES" and the program enters a processing function wherein the message "CUT(FILL)=xx(xx)" will be provided on the display 12 to indicate the total number of sections which must be cut and the total number of sections which must be filled. At this time, the operator can enter the processing function "USE CUT/FILL SWITCH TO REVIEW FIELD" and use the grade control switch 30 on the control panel to select those sections which are to be displayed on the graphic display 14. For example, by setting the switch at the "AT GRD" position, those grid sections which are at the selected grade will be displayed. Similarly, by setting the switch at the "+0.2" position, those grid squares which are +0.2 elevational units above the desired grade will be displayed. The "MAX" setting of the switch 30 causes all grid square locations from which cuts have to be made to be displayed, while the "MIN" setting causes all sections which must be filled to be displayed.

After the cut/fill map has been displayed, or if the operator has responded with a "NO" to the decision point "DISPLAY CUT/FILL MAP?", the program enters a decision point wherein the message "DO YOU WANT A PROFILE?" is displayed to the operator. A profile is a graphical display, similar to a bar graph, which represents the field profile along a particular column or row. If the operator responds with a "YES", the program branches to a decision point "ROW PROFILE?". If the operator desires a row profile, he responds with a "YES" and the program enters a processing function "ROW=    " which appears on display 14. At this time, the operator uses the digit select switches through the processing function "USE DIGIT CONTROLS TO SET ROW" to set the desired row. The program then enters a decision point "COLUMN PROFILE?" which is also entered if the operator responded with a "NO" at the "ROW PROFILES?" decision point. If the operator desires a column profile, he responds with a "YES" and the program enters a processing function to display "COLUMN=    ". The operator then uses the digit control to set the desired column value through the processing function "USE DIGIT CONTROLS TO SET COLUMN".

After either the column profile has been displayed, or if the operator has responded "NO" to the "COLUMN PROFILE?" decision point, or if the operator has responded "NO" to the "DO YOU WANT A PROFILE?" decision point, the program enters the decision point "GRID POINT CHECK OR CHANGE?". At this point, the operator can, by responding with a "YES", set a flag which will enable him to either check the elevation at a particular grid point or, change the value of the elevation. If the operator does not desire a grid point check, he responds with a "NO" and the program branches to the decision point "CONTINUE SURVEY?" as discussed hereinabove.

Figure 4D:
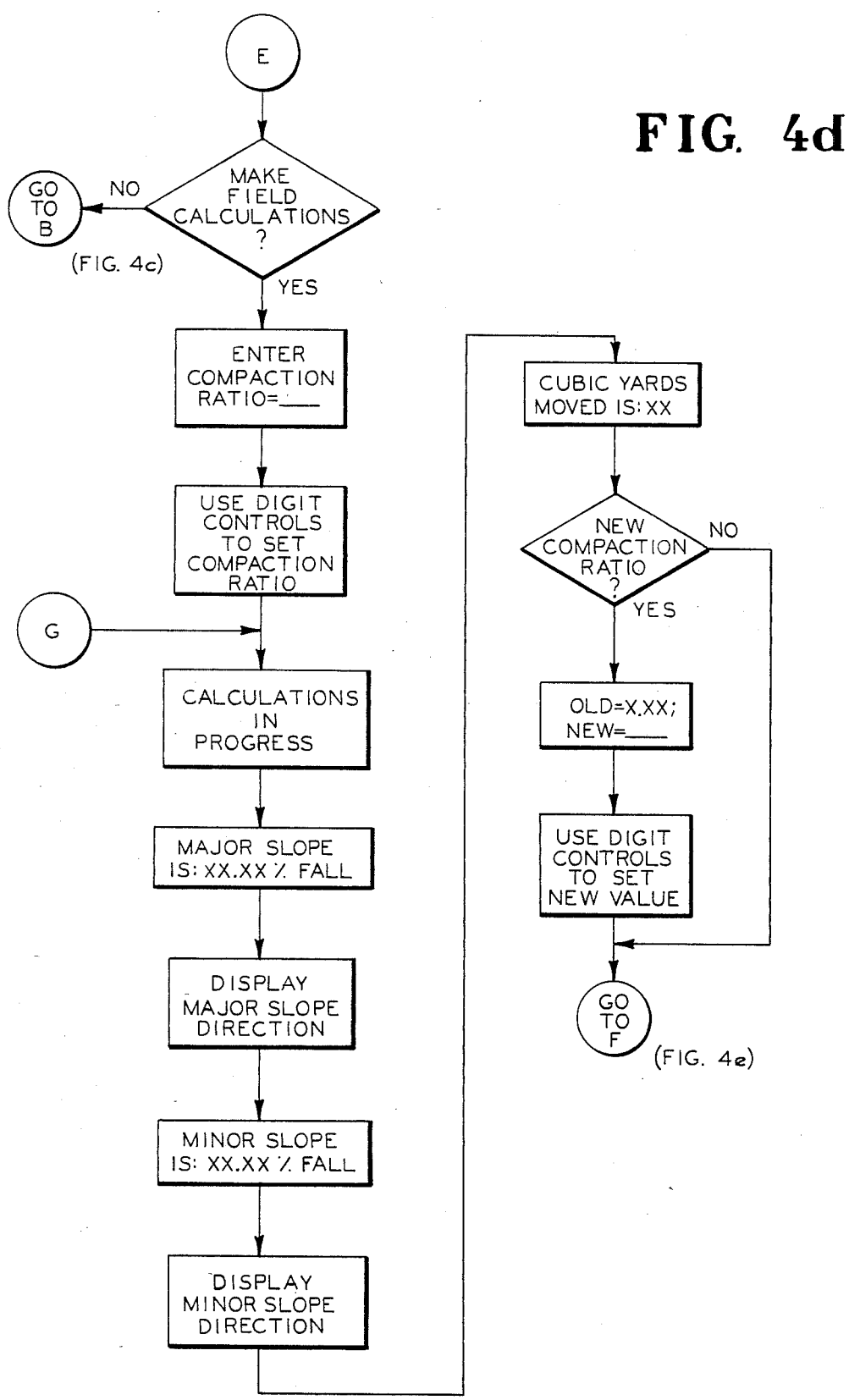
Figure 4E:
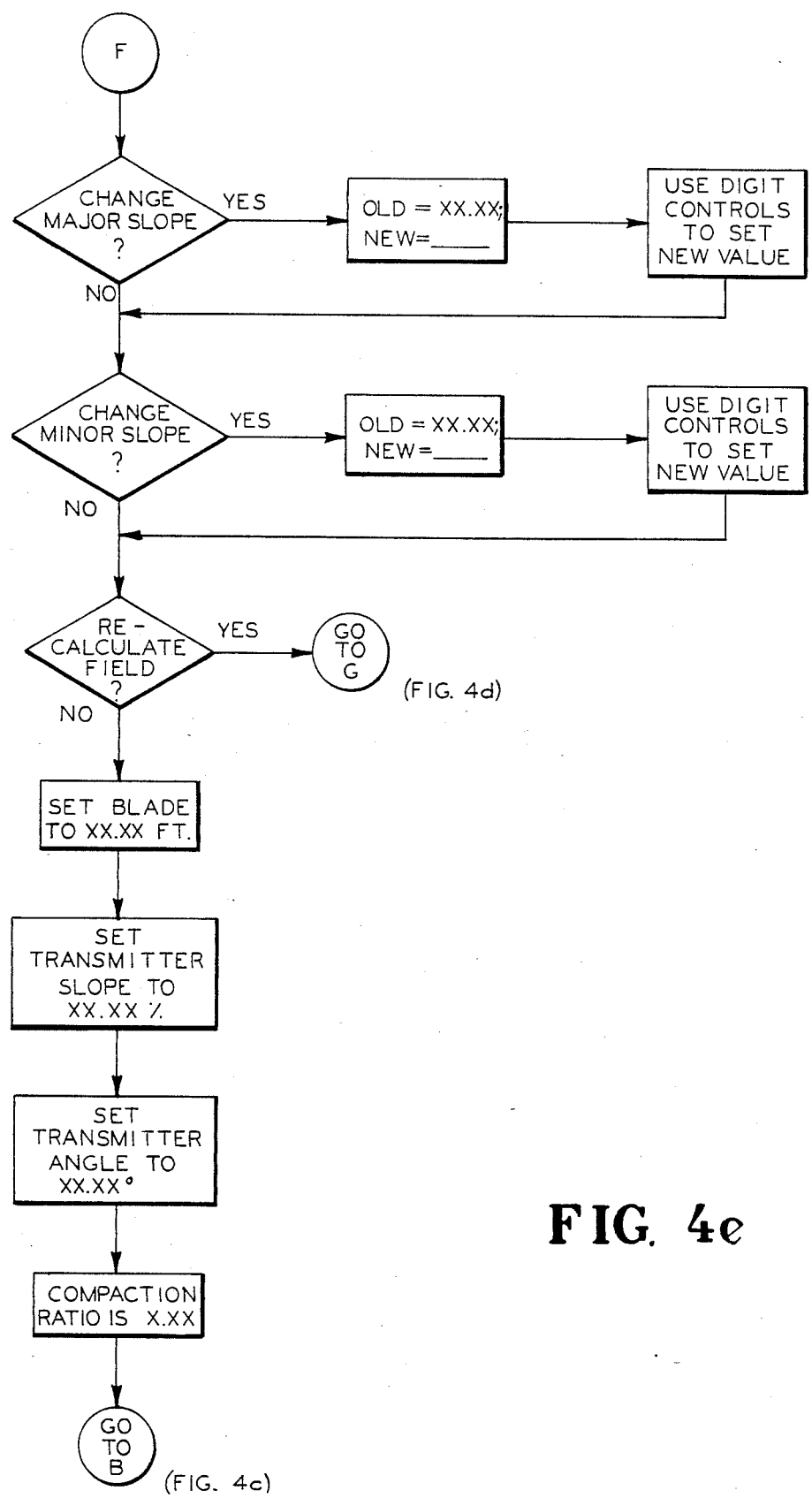

Once the survey has been completed, the operator can respond "NO" to the decision point "CONTINUE SURVEY?" or index through the program to point E of FIG. 4d in order to perform field calculations relating to the surveyed field. From point E, the program enters a decision point "MAKE FIELD CALCULATIONS?" wherein this message is displayed to the operator. If the operator responds with a "NO", the program branches to point B, found in FIG. 4c. However, if the operator responds with a "YES", the program enters a processing function "ENTER COMPACTION RATIO=    " wherein this statement is displayed to the operator. At this time, the operator can use the digit select switches through the processing function "USE DIGIT CONTROLS TO SET COMPACTION RATIO" to set the compaction ratio. The compaction ratio represents the ratio between a given volume of loose, uncompacted dirt and the volume of the same amount of dirt compacted to various degrees.

Once the compaction ratio has been set by the operator, the program enters a processing function wherein the message "CALCULATIONS IN PROGRESS" is displayed to the operator. The microcomputer then proceeds to make the necessary calculations which will result in a graded field for the least amount of dirt to be moved. These calculations will be discussed in more detail hereinafter. After the microprocessor has completed the calculations, the program branches to a processing function wherein the message "MAJOR SLOPE IS: XX.XX% FALL" is displayed. Such a value represents the percentage of fall along the major slope of the grade, which corresponds to the most inclined portion of the field. The graphic display 14 can then be utilized to display the direction of the major slope through the processing function "DISPLAY MAJOR SLOPE DIRECTION". From this point, the program enters a processing function and displays to the operator "MINOR SLOPE IS: XX.XX% FALL" wherein the value of the minor slope is displayed on the display 12 and the direction of the slope is indicated on the display 14 through the processing function "DISPLAY MINOR SLOPE DIRECTION". The program then enters a processing function "CUBIC YARDS MOVED IS: XX" wherein the total cubic yards of dirt which must be moved to achieve the above major and minor slopes is displayed.

After the above information has been displayed, the program enters a decision point "NEW COMPACTION RATIO?" wherein this message is displayed to the operator. If the operator desires the field to be recalculated with a new compaction ratio, he responds with a "YES" wherein the program displays "OLD=X.XX; NEW=     ". At this time, the operator uses the digit select switches to set a new value for the compaction ratio through the processing function "USE DIGIT CONTROLS TO SET NEW VALUE". From this point, or if the operator has responded with a "NO" to the "NEW COMPACTION RATIO?" decision point, the program enters a decision point "CHANGE MAJOR SLOPE?" at point F in FIG. 4e. If the operator desires to change the major slope, he responds with a "YES" wherein the program displays "OLD=XX.XX; NEW=     ". The operator can then use the digit controls to set a new value for the major slope through processing function "USE DIGIT CONTROLS TO SET NEW VALUE".

At this time, or if the operator has responded with a "NO" to the question of changing the major slope, the program enters a decision point wherein the message "CHANGE MINOR SLOPE?" is displayed. If the operator desires to change the minor slope, he responds with a "YES" and the program displays "OLD=XX.XX; NEW=     ". The operator then uses the digit select switches to set a new value for the minor slope through the processing function "USE DIGIT CONTROLS TO SET NEW VALUE".

Once either or all of the compaction ratio, the major slope, and the minor slope have been changed, or the operator answered "NO" to the change minor or slope question, the program enters the decision point "RECALCULATE FIELD?" wherein such a message is displayed to the operator. If the operator responds with a "YES", the program enters the processing function "CALCULATIONS IN PROGRESS" at point G in FIG. 4d and proceeds to calculate the various parameters. After the calculations relating to the desired field grade have been made, the operator responds with a "NO" to the question "RECALCULATE FIELD?", and the program enters a series of processing functions which provide the operator with information related to the blade height setting and transmitter settings required to obtain the desired grade.

The first of these processing functions reads "SET BLADE TO XX.XX FT.". Next, the program enters a processing function "SET TRANSMITTER SLOPE TO XX.XX%". Next, the program enters a processing function "SET TRANSMITTER ANGLE TO XX.XX°". The program then enters a processing function "COMPACTION RATIO IS X.XX" wherein the compaction ratio is displayed. The operator can then set the leveling blade and the transmitter to the above setting and proceed to drive the vehicle over the field to move dirt in order to obtain the desired grade. The height of the blade will automatically be controlled by the circuit 58 such that the above grade sections will be reduced, while the dirt from the above grade sections will be moved into the below grade sections. The program proceeds to point B in FIG. 4c.

The calculation routines utilized by the present invention will now be discussed. Before determining the calculated information which is displayed to the operator, the system first calculates a plurality of variables using the elevational data obtained by the survey. These variables include the following (wherein the sign * represents a multiplication operation):

GRID = Grid spacing (in feet)
$R$ = Row position
$C$ = Column position
$RN$ = Number of rows
$CN$ = Number of columns
$Y(C,R)$ = Elevational data reading at column position $C$, row position $R$
$N$ = Number of elevational data points = $RN*CN$ $SXR$ = Summation of each row position times grid spacing = $\sum_{R=1}^{RN} R*\text{GRID}$ $SXR2$ = Summation of the square of each row position times grid spacing = $\sum_{R=1}^{RN} (R*\text{GRID})^2$ $SXC$ = Summation of each column position times grid spacing = $\sum_{C=1}^{CN} C*\text{GRID}$ $SXCR$ = Summation of the square of each column position times grid spacing = $\sum_{C=1}^{CN} (C*\text{GRID})^2$ $SRCN$ = Summation of $(C*\text{GRID})*(R*\text{GRID})$ at each elevational data point =

$\sum_{C=1}^{CN} C*\text{GRID}*\left(\sum_{R=1}^{RN} R*\text{GRID}\right)$ $SY$ = Summation of each elevational data point =

-continued $$\sum_{C=1}^{CN} \left( \sum_{R=1}^{RN} Y(C,R) \right)$$

SXRY = Summation of each elevational data point times $(R*\text{GRID}) = \sum_{C=1}^{CN} \left( \sum_{R=1}^{RN} Y(C,R)*R*\text{GRID} \right)$ SXCY = Summation of each elevation data point times $(C*\text{GRID}) = \sum_{R=1}^{RN} \sum_{C=1}^{CN} Y(C,R)*C*\text{GRID}$ After the above variables have been determined, the system can then proceed to determine the slope in the row direction (east-west slope of FIG. 3a) and the slope in the column direction (north-south slope of FIG.3a) which results in the best fit plane for the current elevational data. The best fit plane represents a plane having a predetermined grade which can be formed by moving the least amount of dirt. The slope in the row direction (represented by variable B2) can be calculated as follows:

$$B2 = \frac{[(N*SXRY - SXR*SY)*(N*SXC2 - SXC*SXC) + (N*SRCN - SXC*SXR)*(N*SXCY - SXC*SY)]}{[(N*SXR2 - SXR*SXR)*(N*SXC2 - SXC*SXC) + (N*SRCN - SXR*SXC)*(N*\text{SRCN} - SXR*SYC)]}$$

The slope in the column direction (represented by variable B1) can be calculated as follows:

$$B1 = \frac{N*[(SXCY - B2*SRCN) - (SXC*(SY - B2*SXR)]}{(SXC2 - SXC*SXC)}$$

The row slope in terms of percentage and the column slope in terms of percentage can be calculated by multiplying the respective B2 or B1 results by one hundred.

After the row slope (B2) and the column slope (B1) have been calculated, the value and direction of the compound slope of the best fit plane can be determined. As previously mentioned, the compound slope represents the steepest grade along any line of direction in the best fit plane. The value of the compound slope (represented by variable A2) in terms of percentage can be calculated as follows:

$$A2 = \sqrt{(B1*B1 + B2*B2)} * 100$$

The direction of the compound slope (represented by variable A3) in terms of degrees offset from the transmitter direction can be calculated as follows:

$$A3 = \text{ARCTAN}\left(\frac{B1}{B2}\right)$$

Wherein ARCTAN represents the arc tangent.

After the above slope routines have been performed, the system can proceed to determine the new elevational data values at each grid point based on the slopes corresponding to the best fit plane. First, the system can determine the new elevation (represented by variable A1) at the row 0, column 0 position as follows:

$$A1 = \left(\frac{1}{N}\right) * (SYY - B1*SXC - B2*SXR)$$

When the A1 variable has been determined, the new elevation (YN) at any selected row position (RPOS) and any selected column position (CPOS) can be calculated as follows:

$$Y = A1 + B1*CPOS + B2*RPOS$$

As the system proceeds to calculate the new elevation data at each grid point, the system can accumulate data as to the amount by which each grid square must be cut (dirt removed) or filled (dirt added). In the event the operator desires the system perform the elevational calculations for a field to be graded at a plane different from the best fit plane, the operator can provide the system with the desired slope data.

When the elevational data corresponding to the desired grade has been determined, the system can proceed to determine the amount of dirt which must be moved in order to produce a field of the selected grade. In determining the amount of dirt which must be moved, the system first proceeds to compile a "CUT" total and a "FILL" total by comparing the actual elevational data with the desired elevational data. The CUT total represents the sum of the positive differences between a desired elevational value subtracted from the corresponding actual elevational value, while the FILL total represents the sum of the negative differences.

The total amount of dirt which must be cut (TCUT) can then be calculated as follows:

$$TCUT = CUT*GRID*GRID$$

If the GRID value is in units of feet, the total amount of dirt which must be cut in units of cubic yards can be determined by dividing the above value by twenty-seven. The total amount of dirt which must be added can be calculated in a similar manner.

Under best fit plane conditions, the compaction ratio (ratio of the amount of dirt which must be cut to the amount of dirt which must be filled) will typically be 1:1, i.e., the amount of dirt which is cut equals the amount of dirt which is filled. In instances wherein the plane selected by the operator is not the best fit plane, the compaction ratio will typically be greater than one and can be calculated by dividing the CUT total by the FILL total.

In summary, the present invention concerns a system for surveying the contour of an area of land. A stationary transmitter for generating a rotating laser beam in a plane above the land and a receiver adapted to be mounted on a movable vehicle and responsive to the beam generate an elevation signal representing the elevation of the land at the receiver location relative to a predetermined reference level. A control circuit is connected to receive the elevation signal and includes means for generating grid signals representing a predetermined grid pattern having a plurality of grid points representing locations on the area of land at which an elevational reading is to be taken. The control circuit also includes means for storing the elevation signal of a selected one of the grid points when the receiver is located at the corresponding location on the area of land. Furthermore, the control circuit also includes input means such as the panel controls 32 for generating various input signals.

In accordance with the provisions of the patent statutes, the principle and mode of operation of the invention have been explained and illustrated in its preferred embodiment. However, it must be understood that the invention can be practiced without departing from its spirit or scope.

What is claimed is:

1. In a system for surveying the contour of an area of land including a stationary transmitter for generating a rotating laser beam in a plane above the area of land to be surveyed, and a receiver movable about the area of land and responsive to the rotating laser beam for generating an elevation signal representing the elevation of the land at the receiver location relative to a predetermined reference level, a control circuit connected to receive the elevation signal from the receiver, said control circuit comprising:
   input means for inputting a direction signal representing a predetermined side of the area of land;
   means for generating grid signals representing a predetermined grid pattern having a plurality of grid points representing locations on the area of land at which an elevation reading is to be taken; and
   means for storing said direction signal and the elevation signal of a selected one of said grid points when the receiver is located at the corresponding location on the area of land.

2. A control circuit according to claim 1 including input means for generating a code signal connected to said means for generating grid signals which is actuated in response to said code signal.

3. A control circuit according to claim 1 including input means for inputting a bench mark signal representing one of said grid points selected as the predetermined reference level and wherein said means for storing stores said bench mark signal.

4. A control circuit according to claim 1 including input means for inputting a control box elevation signal representing the distance between a predetermined point on the receiver and the surface of the land and wherein said means for storing stores said control box elevation signal.

5. A control circuit according to claim 1 including input means for inputting a transmitter angle signal representing the angle between the setting of the transmitter and a predetermined reference direction line with respect to the area of land and wherein said means for storing stores said transmitter angle signal.

6. A control circuit according to claim 1 including input means for inputting a transmitter slope signal representing the angle between a plane defined by the laser beam and a horizontal plane with respect to the land and wherein said means for storing stores said transmitter slope signal.

7. A control circuit according to claim 1 including input means for inputting a grid spacing signal representing the distance between adjacent ones of said plurality of grid points and wherein said means for storing stores said grid spacing signal.

8. A control circuit according to claim 1 wherein said grid pattern includes rows and columns of said grid points and said control circuit includes input means for generating a turn signal when the receiver is moved from one column of said grid points to the next column of said grid points and wherein said means for storing stores said turn signal.

9. A control circuit according to claim 1 including input means for generating a bag signal when the receiver is located at one of said grid points, said means for storing being responsive to said bag signal for storing the elevational reading at said one grid point.

10. A control circuit according to claim 1 including display means responsive to said elevation signals for displaying the elevation of the land at each of said grid points.

11. A control circuit according to claim 1 wherein said means for generating grid signals generates said grid signals in a predetermined sequence including a first grid signal for each grid point for which one of said elevational signals has been stored and a second grid signal for the next one of said grid points in said sequence for which an elevation signal is to be stored and wherein said control circuit includes display means responsive to said grid signals for displaying a solid dot for each one of said first grid signals and a flashing dot for said second grid signal.

12. A control circuit according to claim 1 including input means for inputting a grade control signal representing a reference level with respect to said predetermined reference level and wherein said control circuit includes display means wherein said means for generating grid signals is responsive to said grade control signal and said stored elevation signals for generating grid signals representing grid sections which are at said reference level with respect to said predetermined reference level.

13. A control circuit according to claim 1 including input means for inputting a row/column signal representing a selected one of the rows and columns defining said grid pattern, and display means and wherein said means for generating grid signals is responsive to said row/column signal and said stored elevation signals for generating grid signals representing elevation of the land in the selected one of the rows and columns.

14. A control circuit according to claim 1 including input means for inputting a compaction ratio signal, and wherein said means for storing stores said compaction ratio signal.

15. A control circuit according to claim 1 wherein said means for generating grid signals generates a plurality of output signals representing characteristics of the grade of the area of land after grading.

16. A control circuit according to claim 15 wherein one of said output signals is a major slope signal representing the value of the percentage of fall along the major slope of the grade.

17. A control circuit according to claim 15 wherein one of said output signals is a minor slope signal representing the value of the percentage of fall along the minor slope of the grade.

18. A control circuit according to claim 15 wherein one of said output signals is a cubic yards moved signal representing the value of the amount of dirt which must be moved to achieve the grade.

19. A control circuit according to claim 15 including input means for generating a change signal and wherein said means for generating said grid signals is responsive to said change signal for changing the value of a selected one of said output signals.

20. A control circuit according to claim 15 wherein one of said output signals represents the value of the height of a blade above the predetermined reference level to obtain the grade, said blade and the receiver being mounted on a movable vehicle.

21. A control circuit according to claim 15 wherein one of said output signals represents the value of the transmitter slope to obtain the grade.

22. A control circuit according to claim 15 wherein one of said output signals represents the value of the transmitter angle to obtain the grade.

23. A control circuit according to claim 15 wherein one of said output signals represents the value of the compaction ratio.

24. A control circuit according to claim 1 wherein said means for storing is a modular storage unit including means for selectively disconnecting from said control circuit, said storage unit retaining said elevation signals after said unit is disconnected from said control circuit.

25. A control circuit according to claim 24 wherein said modular storage unit includes a random access memory unit for storing said elevation signal and a power supply unit connected to said random access memory.

26. A control circuit according to claim 1 including means for storing a plurality of message signals and a display means responsive to said message signals for displaying messages associated with said predetermined grid pattern.

27. A control circuit according to claim 26 wherein said means for storing a plurality of message signals includes a first modular language storage unit connected to said control circuit for storing first message signals and means for selectively disconnecting said first modular language storage unit from said control circuit, and a second modular language storage unit for storing second message signals and means for selectively connecting said second modular language storage unit to said control circuit in place of said first modular language storage unit, and wherein said display means is responsive to said first and second message signals for displaying messages in first and second languages respectively.

28. In a system for surveying the contour of an area of land including a stationary transmitter for generating a rotating laser beam in a plane above the area of land, and a moveable receiver responsive to the laser beam for generating an elevation signal representing the height of the land at the location of the receiver with respect to a reference level, a control circuit connected to the receiver and the control circuit comprising:

input means for generating a bag signal representing a location at which an elevation signal is to be generated;

means for storing the elevation signal;

means responsive to said bag signal for enabling said means for storing to store the elevation signal corresponding to the location of the receiver;

means for generating grid signals representing a predetermined pattern of grid locations on the area of land at which elevation readings are to be taken including first grid signals representing grid locations for which elevation signals have been stored in said means for storing a second grid signal representing the next grid location at which one of the elevation signals is to be generated; and display means responsive to said first grid signals for displaying a solid dot and responsive to said second grid signal for displaying a flashing dot.

29. A control circuit according to claim 28 including means for storing message signals, and display means responsive to said message signals for displaying messages wherein said means for storing message signals includes a first modular language storage unit connected to the control circuit for storing first message signals and means for selectively disconnecting said first modular language storage unit from the control circuit, and a second modular language storage unit for storing second message signals and means for selectively connecting said second modular language storage unit to the control circuit in place of said first modular language storage unit, and wherein said display means is responsive to said first and second message signals for displaying messages in first and second languages.

* * * * *